March 7, 1961 M. C. DEPP 2,974,264
SYNCHRO SERVOSYSTEM TWO-CYCLE ERROR COMPENSATOR
Filed Oct. 16, 1959

INVENTOR
MARLIN C. DEPP
BY
ATTORNEY

United States Patent Office 2,974,264
Patented Mar. 7, 1961

2,974,264

SYNCHRO SERVOSYSTEM TWO-CYCLE ERROR COMPENSATOR

Marlin C. Depp, Wantagh, N.Y., assignor to Sperry Rand Corporation, Great Neck, N.Y., a corporation of Delaware Filed Oct. 16, 1959, Ser. No. 846,960

6 Claims. (Cl. 318—30)

This invention relates generally to data transmission apparatus and more particularly to apparatus for compensating two cycle errors in alternating current data transmission systems.

Data transmission two cycle errors are characterized by the presence of four maximum and four zero points of error during a 360° rotation of a data transmitter's or receiver's rotor. Such errors occur for a variety of reasons, of which, impedance mismatching between the stator legs of a data transmitter and/or receiver is the primary cause. This source of two cycle error will be discussed in more detail later.

U.S. Patent 2,810,102, issued October 15, 1957, to M. Depp et al., and assigned to the same assignee as the present invention, shows a two cycle error compensator which serially inserts inductive impedances between the respective legs of a flux valve data transmitter and receiver to, in effect, render the leg impedances equal. The structure shown in that patent comprises a stator having the aforesaid inductive impedances wound on it and a ferromagnetic rotor which may be rotatively and axially positioned. By rotating the rotor, the relative impedances of the inductors are varied. This has the effect of selecting which leg, or legs, is to have its impedance changed. By positioning the rotor axially, the inductances, and therefore the impedances, of the windings are simultaneously increased or decreased. This has the effect of determining the magnitude of the added compensating impedance. When the impedance added is such that all legs of the transmitter or receiver are effectively rendered equal, two cycle error is compensated for.

In the present invention, the prior art requirement for axial movement of the compensator rotor is avoided. The apparatus of the present invention includes a stator having coils wound on it and a rotor which may be rotatively positioned relative to the stator. A coil is wound about the rotor and the ends of the coil are terminated by a variable impedance. Each of the stator coils is serially connected between the respective legs of a data transmitter and data receiver. Alternating current signals being conveyed from the data transmitter through the stator coils to the data receiver encounter in each of the stator coils an impedance, the magnitude of which depends on the value of the impedance connected across the rotor coil and the angle which said rotor coil makes with a particular stator coil. With large impedances connected across the rotor coil, the effect of the rotor coil position on the stator coil impedances is small; for smaller impedances connected across the rotor coil the effect of rotor coil position on the stator coil impedances is large. This results from the fact that in a mutually coupled circuit, current flow in the secondary (rotor coil) alters the impedance of the primary circuit. Thus for maximum effect, neglecting resonance conditions, the secondary should be short-circuited on itself. And for maximum effect on a particular stator coil, the rotor coil should be aligned for maximum coupling with that coil.

As in the case of U.S. Patent No. 2,810,102, rotatively positioning the rotor has the effect of selecting which leg, or legs, is to have its impedance increased. However, the magnitudes of the stator coil impedances are not adjusted by variation of the axial position of the rotor, but are determined merely by the value of the impedance connected across the rotor coil.

Accordingly, it is a principal object of the present invention to provide a data transmission two cycle error compensator which has a stator and rotor and which requires only one degree of relative motion between the stator and rotor.

Another object of the invention is to provide a two cycle error compensator which electrically adjusts the magnitude of the error compensation.

Further objects and advantages of the present invention will be apparent from the following description, reference being had to the accompanying drawings, which show a preferred form of the present invention.

In the drawings:

Fig. 1b is a vector diagram of the magnetic fields accompanying the currents induced in the windings of the stator by the rotor coil of Fig. 1a;

Figure 1A:
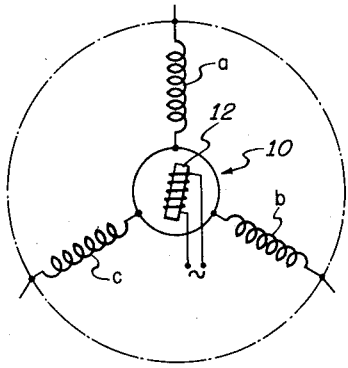
Fig. 1a is a schematic diagram of a Y-connected data transmitter whose rotor is not aligned for maximum coupling with any of the transmitter's stator windings.
Figure 1B:
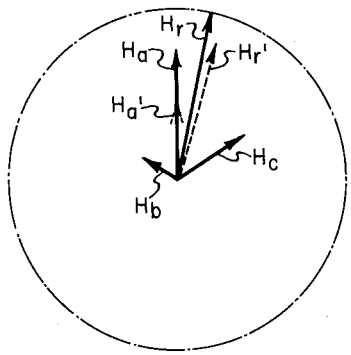

Referring to Figs. 1a and 1b, two cycle error as caused by mismatched impedances between the stator legs of a data transmitter will now be explained. A data transmitter stator 10 is provided with three winds $a$, $b$ and $c$, each having the same number of turns and the same nominal impedance. The rotor 12 is positioned as shown. When windings $a$, $b$ and $c$ have exactly the same impedances and the transmitter is connected to a balanced load, currents are induced in the windings having accompanying magnetic fields respectively represented by vectors $H_a$, $H_b$ and $H_c$. These fields, when vectorially added together, produce the resultant field represented by vector $H_R$ within the transmitter: vector $H_R$ having a direction which exactly corresponds with the rotational position of the rotor 12. If one of the windings, e.g. winding $a$, has an impedance greater than its nominal impedance, a current having an accompanying magnetic field represented by vector $H_a'$ is induced in winding $a$ in place of the current having the accompanying magnetic field $H_a$. When the fields represented by vectors $H_a'$, $H_b$, and $H_c$ are vectorially added together, they produce a resultant field within the transmitter represented by vector $H_R'$. As can be readily appreciated from an examination of Fig. 1b, vector $H_R'$ has a direction which is different from the direction of the resultant vector $H_R$. Therefore, the direction of $H_R'$ does not correspond with the position of rotor 12. This error in direction is due to the impedance unbalance in the stator legs of the data transmitter.

To appreciate the two cycle nature of this error, consider the rotor 12 aligned for maximum coupling with winding $a$. A current smaller than should be induced is induced in winding $a$ and equal currents are induced in windings $b$ and $c$. Vectors $H_b$ and $H_c$, respectively representing the magnetic fields accompanying the currents induced in windings $b$ and $c$, have components perpendicular to a vector $H_a$ representing the magnetic field accompanying the current induced in winding $a$ and components parallel to that vector. The components of vectors $H_b$ and $H_c$ perpendicular to vector $H_a$ are opposite each other and exactly cancel each other. The components of vectors $H_b$ and $H_c$ parallel to vector $H_a$ have no effect on the direction of vector $H_a$. Since the direction of vector $H_a$ is unaffected by the vector addition of $H_b$ and $H_c$, the resultant vector $H_R$ is in the same direction as $H_a$ and no direction error occurs. As the rotor 12 is rotated away from its alignment with winding $a$, an error in the direction of vector $H_R$ starts to appear as in the example shown in Figs. 1a and 1b. This error increases up to a maximum at which time the magnitude of the error starts to fall off to zero again. A zero error occurs when the rotor 12 is aligned for minimum coupling with coil $a$. At this time, no current is induced in a coil $a$. Since no current is induced in coil $a$, the direction of the resultant magnetic field vector $H_R$ is determined only by the correct vectors $H_b$ and $H_c$ and no error occurs. Because the magnitude of the error changed from zero to a maximum and back to zero in a 90° rotation of rotor 12, i.e. a maximum and a zero error per 90° of rotor rotation, four points of maximum error and four points of zero error occur during a 360° rotation of rotor 12. Hence, a two cycle error exists.

Figure 2:
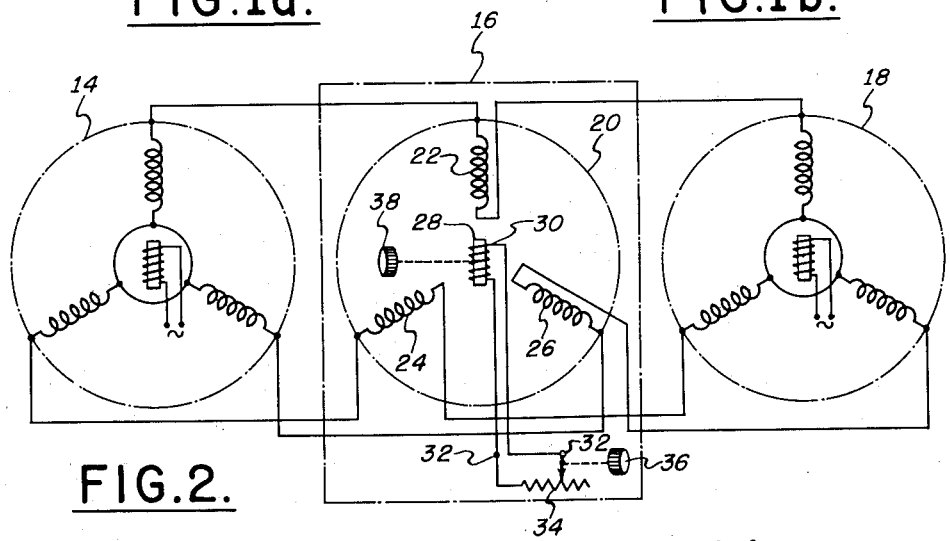
Fig. 2 is a schematic diagram showing a two cycle error compensator embodying the invention, and depicting the variable impedance connected across the rotor coil in its simplest form.

Referring to Fig. 2, the stator windings of the data transmitter 14 are coupled through the two cycle error compensator 16 to the stator windings of the data receiver 18. The two cycle error compensator 16 includes an element 20 which resembles a conventional synchro except for the fact that its three stator windings 22, 24 and 26 are electrically insulated from each other. Both ends of each stator winding 22, 24 and 26 are brought out of element 20 and connect the compensator 16 to the data transmitter 14 and the data receiver 18 in such a way that each winding 22, 24 and 26 is connected in series between respective stator legs of the data transmitter 14 and the data receiver 18. The rotor 28 of element 20 has each end of its rotor coil 30 connected to a terminal 32. Connected across the terminals 32 is a variable impedance which, in this embodiment of the invention, is a rheostat 34. Knob 36 is mechanically coupled to the wiper of rheostat 34 and operates to position the wiper. Knob 38 is mechanically coupled to the rotor 28 and operates to rotate the rotor about its axis.

In operation, knob 36 is rotated to position the wiper of rheostat 34. This has the effect of simultaneously increasing or decreasing the magnitudes of the impedances of the stator windings 22, 24 and 26, each in proportion to the particular coupling angle made with rotor coil 30. For instance, decreasing the impedance connected across rotor coil 30 by moving the wiper of rheostat 34 to the left causes the current in rotor coil 30 to increase and impedance of each stator winding 22, 24 and 26 to correspondingly decrease. Increasing the impedance connected across rotor coil 30 causes the opposite to occur.

Knob 38 is then rotated to position the rotor 28. This has the effect of varying the ratio of the impedances between stator windings 22, 24 and 26. For instance, with the rotor 28 aligned as is shown in Fig. 2, stator winding 22 has its impedance adjusted to a greater extent than the impedance of winding 24 or 26 when the impedance connected across rotor coil 30 is varied. Since the impedance of winding 22 is changed more than the impedance of the other windings, the above-mentioned ratio is likewise changed. If the rotor 28 is rotated to a position of maximum coupling between rotor coil 30 and winding 24 or winding 26, the same will be respectively true for these windings.

Figure 3:
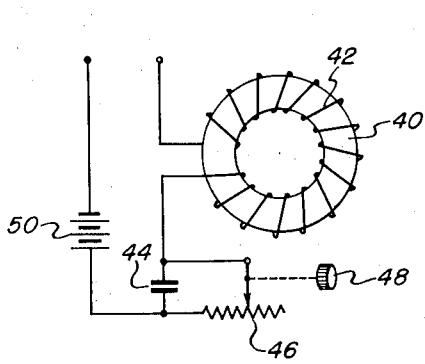
Fig. 3 is a schematic diagram of an alternative variable impedance useable with the present invention.

Referring to Fig. 3, another form of variable impedance circuit which may be connected across terminals 32 is shown. This circuit comprises a toroid 40 of magnetically permeable material with a coil 42 wound on it. Connected in series with the coil 42 is a parallel network consisting of the capacitor 44 and the rheostat 46. The wiper of rheostat 46 is mechanically coupled to the knob 48 which operates to position the wiper. Connected in series with the parallel network of capacitor 44 and rheostat 46 is a direct current source 50.

In operation, the knob 48 is turned to position the wiper of rheostat 46. This causes the direct current through the coil 42 and the magnetic flux linking coil 42 to be set at an amount determined by the position of the rheostat's wiper. Said magnetic flux determines the inductive impedance of coil 42. Alternating current induced in rotor coil 30 passes through the toroid coil 42 and is shunted around the rheostat 46 by the capacitor 44 which has virtually no resistance to the induced alternating current. This permits the rotor coil's induced current, and therefore the impedance of windings 22, 24 and 26, to be determined principally by the inductive impedance of coil 42.

Figure 4:
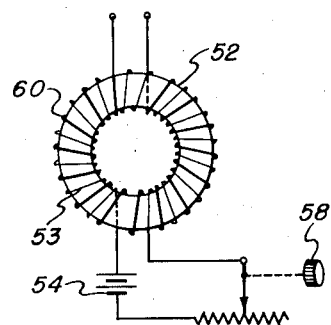
Fig. 4 is a schematic diagram of a preferred variable impedance useable with the present invention.

Another variable impedance circuit which operates similarly to the circuit of Fig. 3 is shown in Fig. 4. This circuit consists of a toroid 52 having a coil 53 wound on it. The coil 53 has the series combination of direct current source 54 and rheostat 56 connected across it. The knob 58 is mechanically connected to the wiper of rheostat 56 and operates to position the wiper. A second coil 60 is also wound on the toroid 52 and is coupled across terminals 32.

By adjusting knob 58, the direct current through coil 53 is varied, thereby varying the magnetic flux through the toroid 52. As the D.C. flux in the toroid 52 is increased, the inductive impedance of coil 60 is likewise decreased. Decreasing the D.C. flux in toroid 52, increases the inductive impedance of coil 60. Coil 60 then operates as did coil 42 of Fig. 3 to vary the impedance of windings 22, 24 and 26.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for compensating two cycle error in a data transmission system having an interconnected $n$ leg transmitter and receiver comprising means having a plurality of spaced apart inductors secured to it, each of said inductors being electrically insulated from the others and adapted to be serially connected between respective legs of the transmitter and receiver, inductor means positionable relative to each inductor in said plurality of inductors to vary the ratio of the impedances between the inductors in said plurality of inductors, and variable impedance means connected across said inductor means whereby the impedance of each inductor in said plurality of inductors is increased when the variable impedance is increased and the impedance of each inductor in said plurality of inductors is decreased when the variable impedance is decreased.

2. Apparatus for compensating two cycle error in a data transmission system having an interconnected $n$ leg transmitter and receiver comprising a stator having a plurality of spaced apart inductors secured to it, each of said inductors being electrically insulated from the others and adapted to be connected in series between respective legs of the transmitter and receiver, an armature rotatably contained within said stator and having a coil wound on it, and variable impedance means connected across said armature coil, whereby the ratio of the impedances between the inductors secured to said stator may be varied by rotating said armature and the impedance of each of said inductors may be respectively increased and decreased by increasing and decreasing the impedance connected across said armature coil.

3. Data transmission apparatus comprising an $n$ leg data transmitter, an $n$ leg data receiver, and a two cycle error compensator, said compensator comprising a stator having a plurality of inductors secured to it in spaced apart relationship, said inductors being connected in series between respective legs of the transmitter and receiver, an armature rotatably contained within said stator and having a coil wound on it, and variable impedance means connected across said armature coil, whereby the ratio between the impedances of the inductors connected in series between respective transmitter and receiver legs is varied by rotating said armature and whereby the impedance of each of said inductors may be respectively increased and decreased by increasing and decreasing the impedance connected across said armature coil.

4. The apparatus of claim 2 wherein said variable impedance means connected across said armature coil comprises ferromagnetic means, a coil wound on said ferromagnetic means, variable resistance means connected in series with said coil, a capacitor connected in parallel with said variable resistance means, said capacitor being adapted to have substantially no reactance to signals at the frequency of the data transmission signals, and a direct current source connected in series with said resistance.

5. The structure of claim 2 wherein said variable impedance means connected across said armature coil comprises ferromagnetic means, first and second coils wound on said ferromagnetic means, said coils being electrically insulated from each other, variable resistance means and a direct current source of potential being connected in series across said second coil, said first coil being connected across said armature coil.

6. Apparatus for compensating two cycle error in a data transmission system having an interconnected data transmitter and receiver comprising a stator, a plurality of spaced apart inductors affixed to said stator, a rotor having a coil secured to it contained within said stator, said rotor being positionable relative to said stator inductors to vary the ratio of the impedances between said stator inductors, said relative movement between said rotor and stator being restricted to only rotation of the rotor within the stator, and variable impedance means connected across said rotor coil to increase and decrease the impedance in each stator inductor when said variable impedance is respectively increased and decreased.

No references cited.